United States Patent [19]
Pritchard

[11] Patent Number: 5,592,028
[45] Date of Patent: Jan. 7, 1997

[54] WIND FARM GENERATION SCHEME UTILIZING ELECTROLYSIS TO CREATE GASEOUS FUEL FOR A CONSTANT OUTPUT GENERATOR

[76] Inventor: Declan N. Pritchard, Saudi Aramco, Box 8647, Dhahran 31311, Saudi Arabia

[21] Appl. No.: 313,769

[22] Filed: Sep. 28, 1994

Related U.S. Application Data

[63] Continuation of Ser. No. 991,336, Dec. 16, 1992, abandoned.

[30] Foreign Application Priority Data

Jan. 31, 1992 [GB] United Kingdom .................. 9202053
Jun. 19, 1992 [GB] United Kingdom .................. 9212977

[51] Int. Cl.⁶ .............................. F03D 9/02; F02C 6/00
[52] U.S. Cl. .............................. 290/55; 290/1 R; 290/52
[58] Field of Search .............................. 290/1 R, 42, 44, 290/53, 55, 52; 320/7, 16; 204/222, 129

[56] References Cited

U.S. PATENT DOCUMENTS

| | | | |
|---|---|---|---|
| 3,484,617 | 12/1969 | Winsel | 290/44 |
| 3,754,147 | 8/1973 | Hancock et al. | 290/53 |
| 3,864,236 | 2/1975 | Lindstrom | 204/265 |
| 4,081,738 | 3/1978 | Roller | 320/7 |
| 4,184,084 | 1/1980 | Crehore | 290/55 |
| 4,863,579 | 9/1989 | Asaoka | 204/224 M |
| 4,966,624 | 10/1990 | Enchev et al. | 75/10.65 |
| 5,041,197 | 8/1991 | Gelb | 205/343 |

FOREIGN PATENT DOCUMENTS

| | | |
|---|---|---|
| 2344648 | 10/1977 | France . |
| 3704280 | 8/1988 | Germany . |
| 261395 | 10/1988 | Germany . |

OTHER PUBLICATIONS

Derenzo, D. J., "Farm and Rural Use Systems," *Wind Power* Noyes Data Corporation, 1979:259–314.
Lippman, Future of Wind Power Gets a Lift, Nov. 17, 1991, pp. H1 & H5, Washington Post.

*Primary Examiner*—Steven L. Stephan
*Assistant Examiner*—Christopher Cuneo
*Attorney, Agent, or Firm*—Woodcock Washburn Kurtz Mackiewicz & Norris

[57] ABSTRACT

Novel means for smoothing electrical power output from wind powered electrical generators is provided. The means utilizes at least some of the power output to convert water into hydrogen, store and burn the hydrogen to produce energy, and use the energy from the burning for the generation of electricity. The means includes a plurality of electrolysis modules consisting of electrolytic cells connected in series, with at least two modules connected in parallel by a switch means.

7 Claims, 2 Drawing Sheets

WIND FARM GENERATION SCHEME UTILIZING ELECTROLYSIS TO CREATE GASEOUS FUEL FOR A CONSTANT OUTPUT GENERATOR

This is a continuation of application Ser. No. 07/991,336, filed on Dec. 16, 1992, now abandoned.

BACKGROUND OF THE INVENTION

1. Field of the Invention

The invention relates to a method of smoothing electrical power output from a means for generating electricity from wind, such as a wind farm, and to a system for providing electrical energy from wind.

2. Description of the Invention Background

A wind farm is a device which generates electricity from wind power. As used hereinafter the term "wind farm" embraces any device or series of devices such as rotors, windmills and the like which are arranged to generate electrical power from wind. The amount of electrical power a wind farm provides is dependent on various factors, inter alia, the cube of the wind speed. Wind speed varies considerably over time thus the electrical power output of a wind farm is extremely variable and unpredictable.

Due to their unpredictable power output, existing designs of wind farms have been limited to being used as sources of low load electricity generation for grids, since they have been considered too unpredictable for use as base, medium or peak load plants for electricity generation for supply to a grid system.

Conventional wisdom suggests that the total contribution of wind power to grid systems cannot exceed 10–20%.

Prior systems for matching wind energy conversion plant output to demand have relied upon electro/mechanical means. These methods involve the sacrifice of the maximum available wind power when maxima occur at times of low demand. During periods of high demand, windfarm output can only provide the instantaneous power that is available from the wind.

It is an object of the present invention to alleviate some or all of the above-mentioned problems so that the value of the output power of wind farms can be enhanced.

SUMMARY OF THE INVENTION

The present invention provides a process for smoothing electrical power output from a means for generating electrical power from wind energy power by utilizing at least some of the electrical power output from the electricity generating means to convert water into hydrogen and oxygen by electrolysis, storing at least the hydrogen, and burning the hydrogen, as required, to produce energy for the generation of electricity.

The invention will permit the use of highly variable DC input from a wind farm and the process may utilise an electrolysis plant including appropriate switch gear for this purpose.

The invention also provides a system for providing electrical energy from wind energy comprising:

a wind farm arranged to generate electrical power;

means for utilizing at least some of the generated electrical power to convert water into hydrogen and oxygen by electrolysis;

hydrogen storage means;

hydrogen combustion means; and means to utilise at least some of the energy produced by the combustion of the hydrogen to electricity.

Preferably the means for utilizing at least some of the generated electrical power to convert water into hydrogen and oxygen by electrolysis includes an electrolysis module comprising a series of electrolysis cells connected in series and a voltage dependent switch means. The voltage dependent switch means provides a number of operating positions which are arranged to supply voltage supplied to the switch means across differing numbers of electrolysis cells.

Electrolysis cells have a narrow band, usually between 1.5 and 2.0 volts, at which they operate with maximum efficiency.

The switch means measures the voltage supplied to it i.e. the voltage between the DC input and earth potential, and determines the switch position depending on that voltage so as to supply the voltage which is supplied to it across the correct number of electrolysis cells so that the voltage across each individual cell is as close to that for maximum efficiency as possible.

In a preferred embodiment the system includes means for monitoring the electrolysis cells to ensure that the current densities flowing through the cells are correct.

The means to convert some of the energy produced to electricity may involve turning generating plant by burning the hydrogen in an internal combustion engine; or burning the hydrogen in a gas turbine;

or burning the hydrogen in a furnace to produce steam directly or by heat exchange to drive a steam turbine.

Alternatively hydrogen fuel cells may be utilised to turn motor/generator sets.

If the hydrogen is burned with oxygen then the condensed steam effluent may be returned to the electrolysis cells since it will be of high purity.

Preferably the system includes control means to monitor and control the system.

DESCRIPTION OF THE DRAWINGS

In the accompanying drawings a preferred embodiment of the invention is shown in which.

DETAILED DESCRIPTION OF THE PREFERRED EMBODIMENTS

Figure 1:
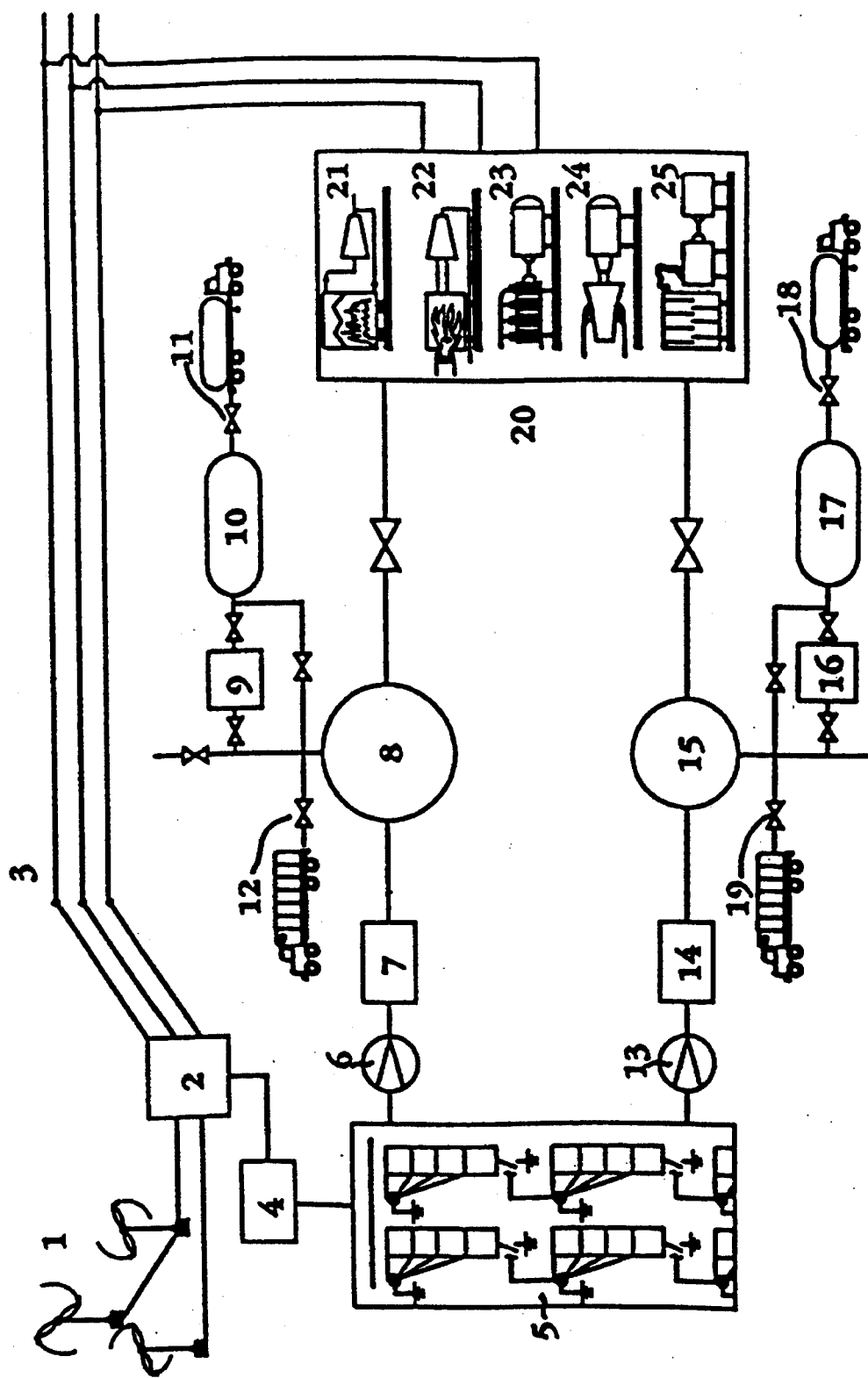
FIG. 1 is a schematic diagram showing a wind farm combined with an electrolysis plant, an energy storage device, various combustion means and generating plant.

Referring to the drawings, which are for the purpose of illustrating the present preferred embodiments of the invention and not for the purpose of limiting the same, FIG. 1 shows a wind farm 1 which provides electrical power via a switch/transformer 2 to either the public utility grid 3 or an AC-DC converter/filter 4.

Any resultant DC output of the wind farm after being suitably filtered by the AC-DC converter/filter 4, is fed to an electrolysis plant 5 where water is split into hydrogen and oxygen. The hydrogen produced then through a pipe to a compressor 6 then into a purification plant 7 and then into hydrogen storage means 8. The oxygen passes via a pipe to a compressor 13 and then via a purification plant 14 into oxygen storage means 15.

After passing into the hydrogen storage means 8, the hydrogen may pass from the storage means 8 to a hydrogen combustion/electrical generation plant 20. Alternatively, the hydrogen may pass from the storage means 8 through a purification/liquefaction plant 9 into long term storage means 10.

From the oxygen storage means 15, the oxygen may pass to the hydrogen combustion/electrical generation plant 20. Alternatively, the oxygen may pass from the storage means 15 through a purification/liquefaction plant 16 into long term storage means 17.

The storage means 8 and 15 should have sufficient capacity to accommodate short term variations in available wind energy (of the order of a few weeks). The long term storage means 10 and 17 should have sufficient capacity to accommodate seasonal variations.

Outlet means at 11 and 18 provide for delivery of liquid hydrogen and liquid oxygen respectively. Outlet means at 12 and 19 provide for delivery of gaseous hydrogen and gaseous oxygen respectively.

The electrical generation plant 20 may incorporate means for burning hydrogen in air or stoichiometrically with oxygen. Various means of combustion may be employed. Non-limitative examples include a conventional steam boiler/steam turbine plant 21, direct generation of steam from the stoichiometric combustion of hydrogen with oxygen 22, an internal combustion engine 23, hydrogen gas turbine combustion 24 or a hydrogen fuel cell 25. All the means 21, 22, 23, 24 and 25 would effect the turning of conventional electrical generating plant which would output electrical power to the grid 3.

Figure 2:
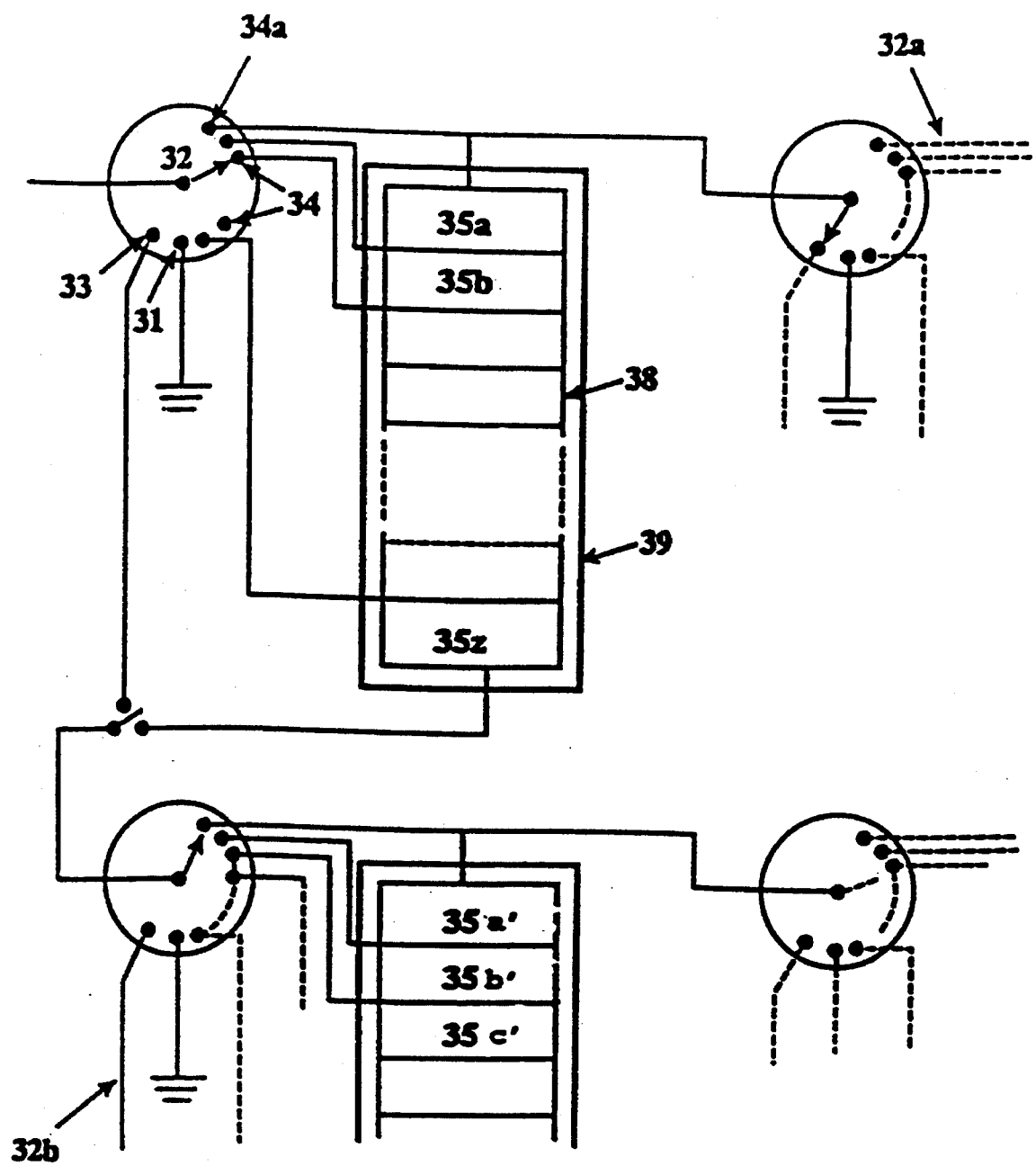
FIG. 2 is a schematic diagram of a voltage controlled switch connected to a module of electrolysis cells.

FIG. 2 shows the electrolysis plant 5 (of FIG. 1) in more detail. The plant includes a number of voltage dependent switches 32 each connected to an electrolysis module 38 (a stack of electrolysis cells 35a, 35b . . . 35z connected in series). DC (+) current from the wind farm, smoothed by the filter 4 (shown in FIG. 1) is passed to a voltage dependent switch 32. The switch has a number of operating positions 34 and the switch includes control means arranged to cause it to adopt a particular position dependent on the voltage across it.

For clarity of description the switch is shown as an electro-mechanical device, although in practice electronic type switching utilizing thyristors would most likely be used. In this case each cell of the module would be connected via a thyristor to the voltage supplied with only one thyristor open at a time to determine the number of cells operating, viz if the thyristor connected to the sixth cell is open the voltage is supplied to the first six cells.

All but two of the switch's positions are connected to a cell 35 of an electrolysis module 38. One position 34a provides for a connection in parallel to the next switch module 32a. The cathode of the end cell 35z in the stack 38 is connected to the next switch/module 32b arrangement in series. In addition, ground 31, and bypass 33 switch positions provide for the isolation of modules for maintenance purposes.

The electrolysis cells 35 have an optimum operating voltage at which they operate with maximum efficiency. Depending on cell construction this optimum operating voltage is normally between 1.5 and 2.0 volts at room temperature. The voltage switch is arranged to ensure that each cell receives the correct voltage across it to ensure maximum efficiency by energizing the correct number of cells. For example if the voltage measured between the input and ground is 16 volts and the electrolysis cells have an optimum operating voltage of 1.6 volts then the switch is arranged to automatically move to a position where the 16 volts is supplied across 10 electrolysis cells. Each of the 10 cells then has a voltage of 1.6 volts across it: if the measured voltage changed to 19 volts then the switch would move to energize a further two cells making a total of 12 energized cells, each of which would have a voltage of 1.58 volts (close to the optimum) across it.

In the present preferred embodiment, the transition between switch positions is done so as to avoid losses due to spike effects and the switch response time is matched to the (31, 33) temporal characteristics of the filter.

(Should the electrical input be negative DC with respect to ground, then the ANODE of the last cell in the stack would be connected to the next switch/module arrangement in series).

The modules are surrounded by a jacket 39 containing an isolated circulating fluid to maintain a constant operating temperature of the cells, independent of the cell operating condition.

Although not indicated in the figure, a means may be provided to monitor the current density through each module and thereby provide feedback to the switch control means.

Further switch/module combinations may be connected in series or parallel, dependent on the voltage and current produced by the wind farm.

In situations where sea water is readily available the electrolysis cells may be configured to incorporate a continuous flow of brine, and a continuously renewed or cleaned anode. In this case no additional means for maintaining a constant operating temperature would be needed, thus environmental impact could be minimal.

The present invention, allows for much longer periodic smoothing of the wind energy availability curve. The result of this is to allow a more reliable design for wind farms based upon seasonal or annual mean wind speed figures. Indeed the invention will permit, in principle, wind energy to contribute up to a 100% of total grid power, limited only by the total energy available in the local wind regime. All electrolysis products are initially put into the various storage means, and the electrolysis plant is made capable of accepting any power input up to the maximum rated,power of the wind plant. This can greatly simplify the design of the wind energy conversion plant as complex electro/mechanical output control is unnecessary.

The wind farm could be designed to produce DC, and therefore hydrogen, at all times and may never have a direct connection to the grid.

The invention can be made ecologically neutral by employing hydrogen combustion in stoichiometric quantities with oxygen. Furthermore, the invention does not contribute to the "greenhouse" effect and enhances the ability of wind farms to reduce total atmospheric carbon emissions.

What is claimed is:

1. In a method of smoothing electrical power output produced by a means for generating electrical power from wind comprising the steps of:

utilizing at least some of said electrical power output to convert water into hydrogen and oxygen by electrolysis;

storing at least the hydrogen;

oxidizing said stored hydrogen, as required, to produce energy; and utilizing said energy produced by the oxidizing of hydrogen for the generation of electricity;

the improvement comprising:

measuring the voltage of said electrical power output;

applying said power output across a number of electrolysis cells connected in series, said number of cells being determined by said voltage;

measuring the current density within said cells;

applying said power output across electrolysis modules connected in parallel, the number of modules being determined by said current density; and optimizing the voltage across each cell and the current density within each cell such that the cells operate with maximum efficiency.

2. An apparatus for providing electrical energy from wind energy comprising:

a wind farm arranged to generate electrical power;

a switch means, including control means, operably connected to electrical power output from said wind farm;

a plurality of electrolysis cells operably connected to said switch means, each electrolysis cell being adapted to convert water into hydrogen and oxygen by electrolysis;

wherein said electrolysis cells are arranged into a plurality of modules, said modules being connected in parallel, each module comprising a series combination of said electrolysis cells;

means for measuring the voltage of said electrical power;

means for monitoring the current density within said cells;

means for storing the hydrogen produced by said electrolysis; and means to generate electricity from said stored hydrogen;

wherein said switch means is operable to apply said electrical power output across a particular number of said electrolysis cells and a particular number of said electrolysis modules;

said number of electrolysis cells being determined by said voltage, and said number of electrolysis modules being determined by said current density;

whereby the voltage across each of said electrolysis cells and the current density within each electrolysis cell is such that the cells operate with optimum efficiency.

3. A system according to claim 2 in which said means to generate electricity from stored hydrogen comprises:

a hydrogen combustion means; and a means to utilise at least some of the energy produced by said combustion to generate electricity.

4. A system as claimed in claim 2 wherein the means to generate electricity from stored hydrogen comprises a gas turbine in which the hydrogen may be burned.

5. A system as claimed in claim 2 wherein the means to generate electricity from stored hydrogen comprises a steam boiler and steam turbine plant.

6. A system as described in claim 2 wherein the switching is mechanical.

7. A system as claimed in claim 2 wherein the switching is electronic.

* * * * *